United States Patent
Chies et al.

[19]

[11] Patent Number: 5,833,406
[45] Date of Patent: Nov. 10, 1998

[54] DUPLICATING MACHINE, PARTICULARLY FOR PUNCHED AND LASER KEYS

[75] Inventors: Ezio Chies, Colle Umberto; Federico Marcon, Conegliano, both of Italy

[73] Assignee: Silca Spa., Italy

[21] Appl. No.: 669,307

[22] PCT Filed: Feb. 24, 1995

[86] PCT No.: PCT/EP95/00675

§ 371 Date: Jul. 3, 1996

§ 102(e) Date: Jul. 3, 1996

[87] PCT Pub. No.: WO95/23666

PCT Pub. Date: Sep. 8, 1995

[30] Foreign Application Priority Data

Mar. 4, 1994 [IT] Italy ............................ VE94 A 000011

[51] Int. Cl.[6] ....................................................... B23C 3/35
[52] U.S. Cl. .............................. 409/81; 409/208; 409/231
[58] Field of Search ................................. 409/81, 82, 83, 409/93, 124, 126, 207, 208, 210, 214, 231, 233

[56] References Cited

U.S. PATENT DOCUMENTS

| | | | |
|---|---|---|---|
| 3,388,619 | 6/1968 | Scheiber et al. | 409/81 |
| 3,684,939 | 8/1972 | Perry | 409/210 |
| 4,175,898 | 11/1979 | Wood | 409/233 |
| 4,242,019 | 12/1980 | Roch | 409/233 |
| 4,426,179 | 1/1984 | Jefferson . | |
| 4,614,465 | 9/1986 | Wu | 409/81 |
| 4,687,389 | 8/1987 | Santii et al. . | |
| 4,750,850 | 6/1988 | Husted | 409/233 |
| 5,128,531 | 7/1992 | Fadel | 409/81 |

FOREIGN PATENT DOCUMENTS

| | | |
|---|---|---|
| 562490 | 9/1993 | European Pat. Off. . |
| 2173004 | 11/1973 | France . |
| 2199493 | 4/1974 | France . |
| 2306043 | 11/1976 | France . |
| 3147248 | 3/1983 | Germany ................................ 409/81 |
| 19007 | 1/1992 | Japan ...................................... 409/81 |

*Primary Examiner*—Daniel W. Howell
*Attorney, Agent, or Firm*—Hoffman, Wasson & Gitler

[57] ABSTRACT

A duplicating machine for punched and laser keys. The machine has on a base two clamps moving simultaneously in a horizontal plane for an original key to be duplicated and for a key blank to be cut, and a carriage moving vertically relative to the clamps and supporting by means of self-centering chucks, a feeler above the original key and a cutter above the blank key, the height of the feeler above its clamp being adjustable independently of the cutter.

7 Claims, 4 Drawing Sheets

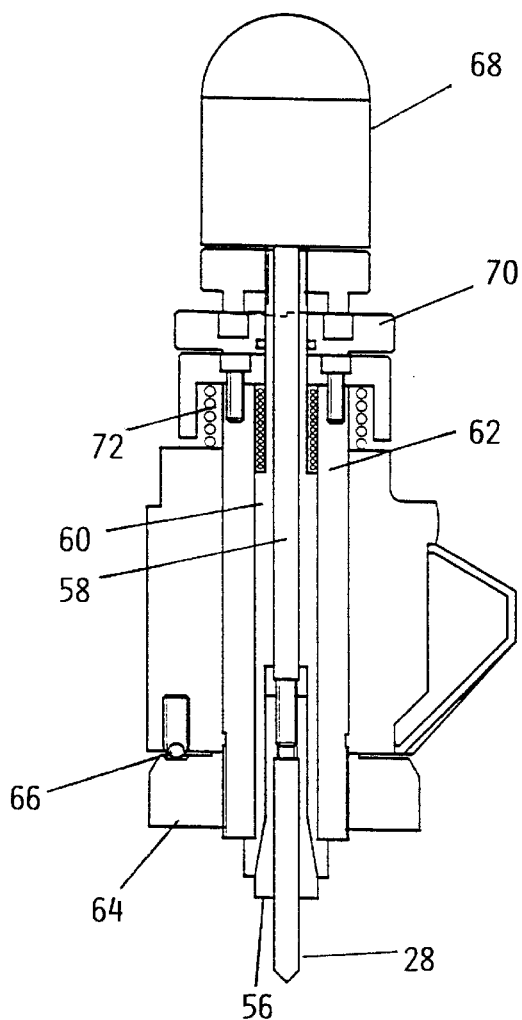
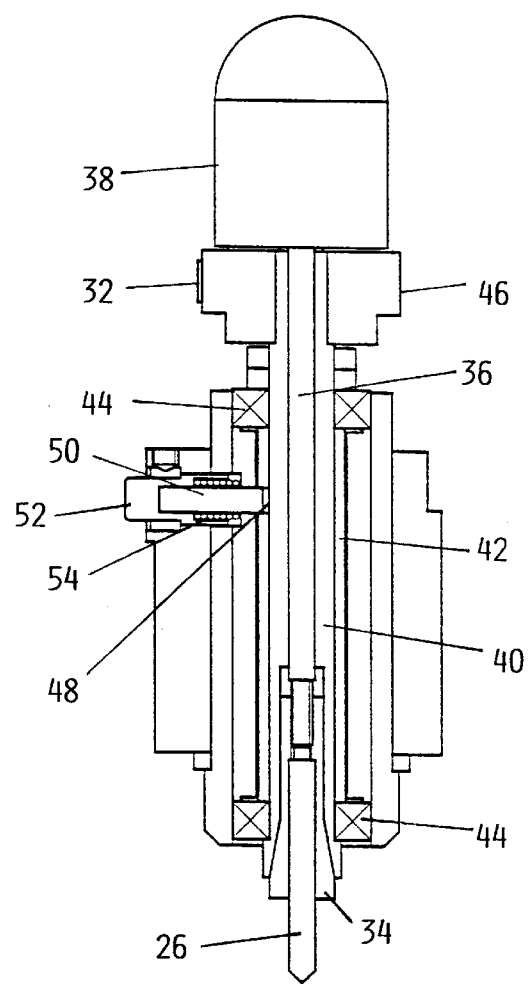
FIG. 5
FIG. 6

DUPLICATING MACHINE, PARTICULARLY FOR PUNCHED AND LASER KEYS

FIELD OF THE INVENTION

This invention relates to a duplicating machine, particularly for punched and laser keys.

DESCRIPTION OF THE PRIOR ART

Punched keys and laser keys are known. Punched keys comprise a head and a shank in which a plurality of cavities of shape, dimensions and positions corresponding to the particular key pattern are formed. A key of this type is shown in FIG. 1.

Known laser keys comprise an inner longitudinal step parallel to the shank edges and carrying a pattern. A keys of this type is shown in FIG. 2.

Duplicating machines for these keys are also known. They generally comprises a base on which there are two clamps, one for the original key to be duplicated and the other for the blank key to be cut in accordance with the pattern present on the original key. In a position above the two clamps there is a vertically movable tool-holding carriage provided with an arbor for a cutter and an arbor for a feeler. In the case of punched keys the cutter and feeler ends are frusto-conical, whereas in the case of laser keys the cutter and feeler ends are cylindrical.

A drawback of known key duplicating machines, in particular those for punched keys, is that the various security cylinder manufacturers generally adopt very heterogeneous cavity dimensional characteristics (depth, cut base diameter, taper angle etc.) for keys of their own production, which means that a large number of tools (frusto-conical cutter and feeler) must be available for frequent changing on the basis of the type of punched key to be duplicated. This means that the duplication operations are somewhat slow and laborious.

A further drawback is that to achieve correct key duplication perfect alignment must be achieved between the feeler tip, which acts on the original key, and the cutter tip, which acts on the blank to be cut, this alignment requiring considerable precision in positioning the tools in the respective arbors, with the need to check the positioning.

A further drawback of known duplicating machines is that special implements are generally required for changing the tools, and in particular the cutter, so that the operator has to have them to hand and is obliged to use them, making tool change even more laborious.

A further drawback is that if duplicating worn keys, the key copy obtained is not a faithful reproduction of the new original but of the worn original.

A further drawback is that when the machine is used to duplicate punched keys, aligning the two tools results in them coming into simultaneous contact with the two keys, which can cause the cutter to operate on the blank key (the copy) before the feeler has completely entered the corresponding cavity of the original key, resulting in difficult position centering.

FR-A-2199493 relates to a key duplicating machine comprising a light optical system allowing to determine the orientation of the cavity by checking the maximum reflexion obtained when the optical system lights the bottom of the cavity.

In this device the feeler is adjusted in such a way that its end exceeds for some millimeters the end of the cutter so that the feeler is placed in the cavity of the original key before the cutter touches the blank key.

BRIEF SUMMARY OF THE INVENTION

An object of the invention is to provide a duplicating machine for punched and laser keys which allows the tools to be quickly and easily changed in relation to the different types of keys to be duplicated.

A further object of the invention is to provide a duplicating machine which enables the tool change to be achieved rapidly and accurately without having to use any implements.

A further object of the invention is to provide a machine in which any wear of the original key can be precisely and predeterminedly compensated.

A further object of the invention is to provide a duplicating machine in which the cutter can be located in its correct cutting position quickly and without uncertainty.

These and further objects which will be apparent from the following description are attained according to the invention through a duplicating machine, particularly for punched and laser keys, comprising on a base two clamps moving simultaneously in a horizontal plane for an original key to be duplicated and for a blank key to be cut, and a carriage movable vertically relative to said clamps and supporting, by means of self-centering chucks, a feeler above the original key and a cutter above the blank key, the height of said feeler above its clamp being adjustable independently of said cutter, characterised in that:

said self-centering chucks are electrically insulated from the machine body and are connected to one terminal of a respective indicator member the other terminal of which is connected to a terminal of an electrical power source, the other terminal of which is connected to the machine body, said self-centering chucks are also connected to two inputs of a logic coincidence circuit the output of which is connected to one terminal of a third indicator member, the other terminal of which is connected to said electrical power source, the self-centering chuck for the cutter is associated with a threaded shaft which is rigid with an operating knob and is housed within a tubular support comprising at least one radial cavity engagable by a radial pin movable axially relative to the structure of said carriage and operable from the outside for its engagement movement.

BRIEF DESCRIPTION OF THE DRAWINGS

The present invention is hereinafter further clarified with reference to the enclosed drawings in which:

FIG. 5 is a partial vertical section on the line V—V of FIG. 3; and

FIG. 6 is a partial vertical section on the line VI—VI of FIG. 3.

DESCRIPTION OF PREFERRED EMBODIMENTS

Figure 1:
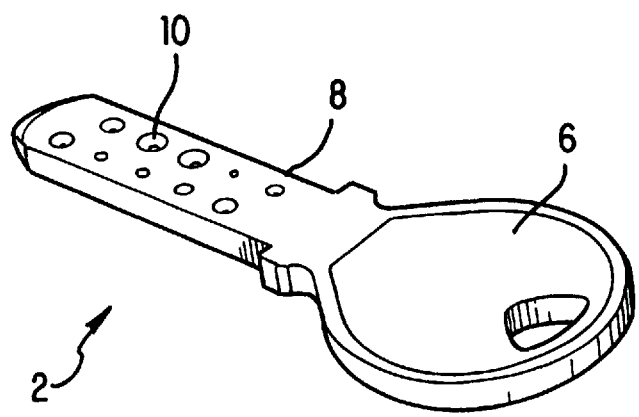
FIG. 1 is a perspective view of a punched key which can be duplicated by the machine of the invention.
Figure 2:
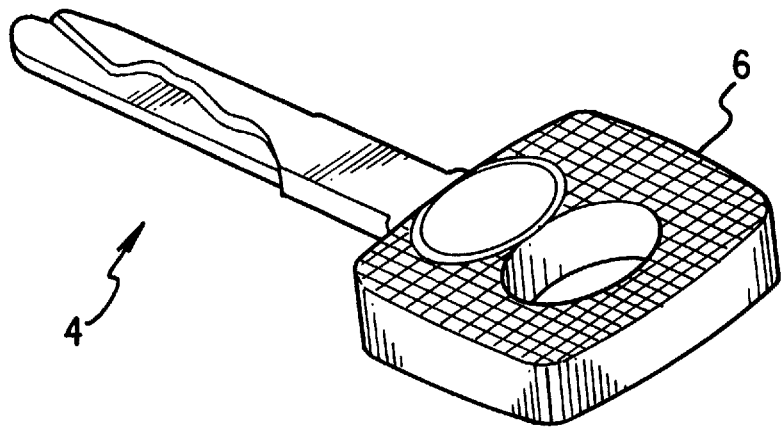
FIG. 2 is a perspective view of a laser key which can be duplicated by the machine of the invention.
Figure 3:
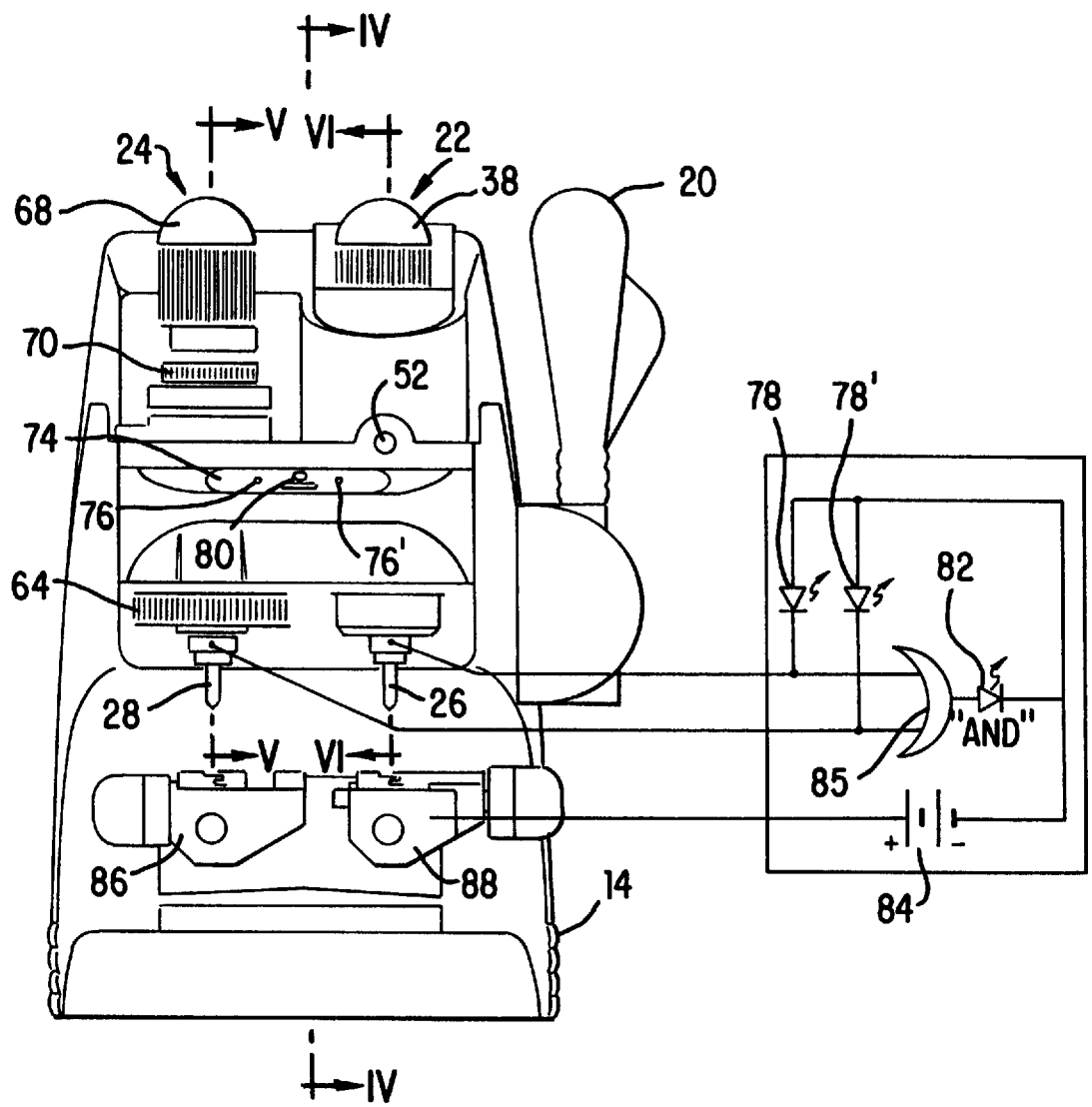
FIG. 3 is a schematic front view of a machine according to the invention with its electrical indicator circuit shown in detail.
Figure 4:
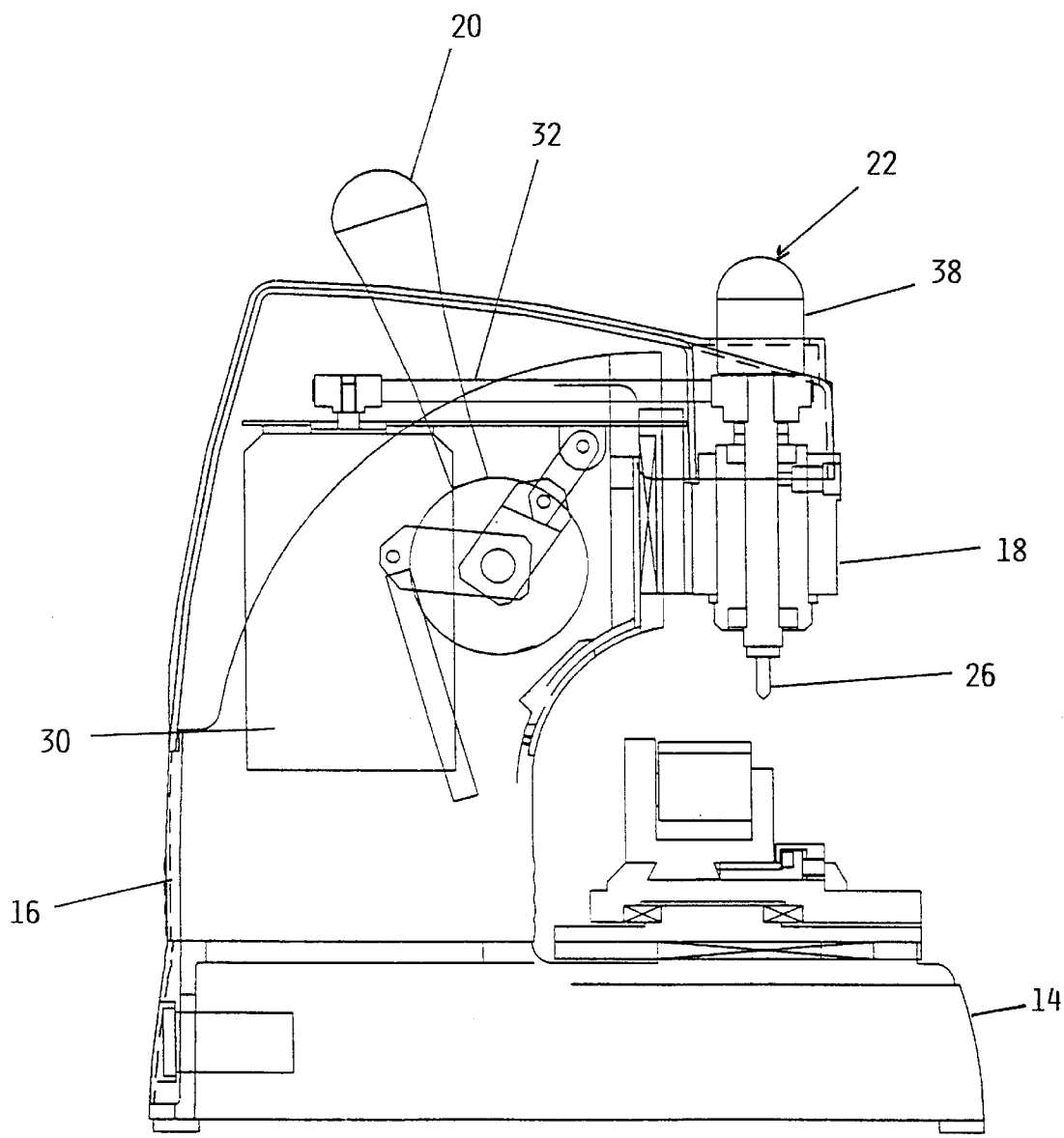
FIG. 4 is a schematic vertical section on the line IV—IV of FIG. 3.

As can be seen from the figures, the machine of the invention is particularly intended for duplicating punched keys 2 or laser keys 4. The punched keys 2 are characterised by a head 6 and by a shank 8 comprising a plurality of cavities 10 having their frusto-conical shape, depth and distribution corresponding to the key pattern.

The laser keys 4 are characterised by a head 6 and by a shank 8 comprising on its two wider faces a step carrying the key pattern.

The machine according to the invention comprises a base 14 provided with a column 16 to which there is applied a carriage 18 vertically slidable on guides, its vertical movements being induced in the conventional manner by a lever 20.

On the carriage 18 there are mounted two self-centering chuck arbors indicated overall by 22 and 24, for clamping a cutter 26 and a feeler 28 respectively.

In the column 16 there is mounted an electric motor 30 for driving the cutter 26 via a belt 32.

The cutter is supported by a self-centering chuck 34 engaged by a threaded shaft 36 rigid with an upper operating knob 38. The self-centering chuck 34 is formed from a number of frusto-conical sector elements housed in a complementary seat provided in an insulated sleeve 40, which is rigid with a tubular support 42 supported by the structure of the carriage 18 via bearings 44. Keyed on the sleeve 40 there is a pulley 46 in which the belt 32 engages.

The tubular support 42 comprises a radial hole 48 in which there can engage the end of a rod 50 movable axially on operating a presser 52 against the elastic reaction of a spring 54 tending to maintain said rod 50 disengaged from said hole 48.

Also mounted on the carriage 18 there is a feeler 28, as stated. This is retained by a self-centering chuck 56, similar to the chuck 54 for the cutter 26 and engaged, as in the case of this latter, by a threaded shaft 58 axially slidable within an insulated sleeve 60 rigid with a tubular support 62.

The tubular support 62 is supported by the body of the carriage 18 and comprises on its lower portion a thread in which there engages a ring nut 64, the angular position of which is defined by the snap engagement of a ball 66, mounted within the body of the carriage 18 and elastically cooperating with a plurality of equiangular radial notches provided within said ring nut 64.

An operating knob 68 similar to the knob 38 is applied to the upper end of the shaft 58, in a position below said knob 38 there being provided a further ring nut 70 engaging in a threaded portion of the sleeve 60 and rotatingly movable between two angular end positions. When in one of these the ring nut 70 provides axially rigid counteraction to the tubular support 62, whereas when in the other it allows the sleeve 60 to undergo a predetermined extent of upward axial travel relative to the carriage 18, against the reaction of a spring 72.

To the carriage 18 there is also applied a small indicator panel 74 on which there are two arrows 76 and 76! pointing vertically in opposite directions and illuminated from their rear by two LEDs 78, 78', and third indicator 80 illuminated from its rear by an LED 82. The three LEDs 78, 78' and 82 are connected to one terminal of a battery 84, the other terminal of which is connected to the machine body. That terminal of the two LEDs 78, 78' not connected to the battery 84 is connected to the self-centering chuck 34 for the cutter 26 and to the self-centering chuck 56 for the feeler 28 respectively, and to two inputs of an AND gate 85, the output of which is connected to that terminal of the LED 82 not connected to the battery 84.

On the machine base 14 in a position below the feeler 28 and cutter 26 there are provided two conventional clamps 86, 88 for the original key and for the blank key respectively, They are mounted on a conventional cross-table enabling the two clamps 86,88 to be moved simultaneously in the horizontal plane.

The duplicating machine of the invention operates in the following manner:

if a punched key is to be duplicated, the original key is clamped in the clamp 86 and the blank key in the clamp 88. The knob 68 is then turned anti-clockwise to open the self-centering chuck 56, a frusto-conical feeler 28 corresponding to the characteristics of the cavities 10 of said key is inserted and the knob turned in the clockwise direction to lock said feeler. The ring nut 70 is then turned in the direction preventing the feeler 28 undergoing axial travel relative to the carriage 18.

To mount the cutter 26 corresponding to that particular feeler, the presser 52 is pressed so that its end engages in the hole 48 of the support 42 to lock its rotation, so enabling the operation of the knob 38 to firstly open the self-centering chuck 34, and then clamp the cutter 26 after its insertion.

Having in this manner changed the feeler and cutter, both inserted into their respective chuck until they abut against a stop and clamped by the knobs 68, 38, they have to be aligned on the keys clamped in the clamps 86, 88. To achieve this, the lever 20 is operated to lower the carriage 18 and hence the feeler 28 onto the original key and the cutter 26 onto the blank key. If contact between the feeler 28 and the original key is simultaneous with contact between the cutter 26 and the blank key, simultaneous lighting of the two LEDs 78, 78' occurs, to cause the LED 82 to light via the AND gate 85, hence indicating the existence of alignment between the feeler and cutter. The circuit is preferably such that lighting of the LED 82 causes extinction of the two LEDs 78, 78'. If instead one of the two tools touches its respective key before the other tool, only the corresponding LED lights, its illuminated arrow indicating to the operator the direction in which the ring nut 64 has to be turned to cause the feeler 28 to move axially until alignment between the two tools is achieved. This operation is facilitated by the provision for making snap rotations of said ring nut 64.

When alignment is achieved, the operator turns the ring nut 70 such as to allow the feeler 28 to undergo spring-loaded axial movement relative to the carriage 18. From this point onwards the duplicating machine operates in the manner of a conventional duplicating machine.

If laser keys are to be duplicated, the operations are performed in the same manner and in the same sequence, except for turning the ring nut 70 to prevent the spring-loaded axial travel of the feeler 28 relative to the carriage 18, this not being done.

From the aforegoing it is apparent that the duplicating machine according to the invention is particularly advantageous compared with traditional duplicating machine, and in particular:

it enables the feeler-cutter pair to be easily and quickly changed on the basis of the particular key to be cut. They are both easily and accurately positionable by abutting against a stop within their respective chuck, which is then rapidly closable by its respective knob, it enables the two self-centering chucks, and in particular that for the cutter, to be operated without using any implement, the type of action to be taken to achieve alignment between the two tools is visually displayed in an immediate and clear manner, it enables any wear of the original key to be compensated to that, having determined this wear and achieved alignment between the two tools, the alignment can be altered to a controlled extent by operating the ring gear 64, to create the proper state of alignment for the original key as new, by virtue of the spring-loaded travel there is certainty that the cutter acts on the blank key only after the feeler has completely engaged the respective cavity and has exactly defined the cutter position on the blank key, the constant length of said travel on the one hand preventing unnecessary wasted travel and on the other hand preventing uncertain positioning.

We claim:

1. A duplicating machine comprising, a base having two clamps for duplicating an original key or cutting a blank key;

a carriage vertically moveable relative to said clamps, a feeler located above the original key and a cutter located above the blank key, self-centering chucks supporting said feeler and cutter on said carriage, the height of said feeler above the clamps being adjustable independently of said cutter, the self centering chucks being electrically insulated from the machine, a first indicator member having two terminals, one terminal connected to a self centering chuck, the other terminal connected to an electrical power source, a logic coincidence circuit having two inputs and an output, the two inputs connected to said self centering chucks, a second indicator member having two terminals, one terminal connected to the output of the logic coincidence circuit, the other terminal connected to an electrical power source, the self centering chuck for the cutter having a rigid threaded shaft having an operating knob and housed within a tubular support, the tubular support having at least one radial cavity, a radial pin engagable with the radial cavity and axially movable relative to said carriage, the radial pin operable from the outside.

2. A machine as claimed in claim 1, wherein the pin has an operating presser and spring maintaining the pin disengaged from the radial cavity.

3. A machine as claimed in claim 1, further comprising an arbor supporting the self-centering chuck for the feeler, and a ring nut for adjusting the axial position of the arbor.

4. A machine as claimed in claim 3, further comprising a plurality of notches on the ring nut, and a snap engagement member, rigid with the carriage, cooperating with the plurality of notches.

5. A machine as claimed in claim 1, wherein the two indicator members comprise a light source and arrows indicating the direction of the ring nut necessary to achieve alignment between the feeler and cutter.

6. A machine as claimed in claim 1, further comprising an arbor supporting the self centering chuck for the feeler, the arbor having spring-loaded vertical movement between an upper and lower position.

7. A machine as claimed in claim 6, further comprising a ring nut on the arbor of the self-centering chuck for the feeler, the ring nut having two end positions that allow or prevent the spring loaded movement.

* * * * *